United States Patent Office 3,268,707
Patented August 23, 1966

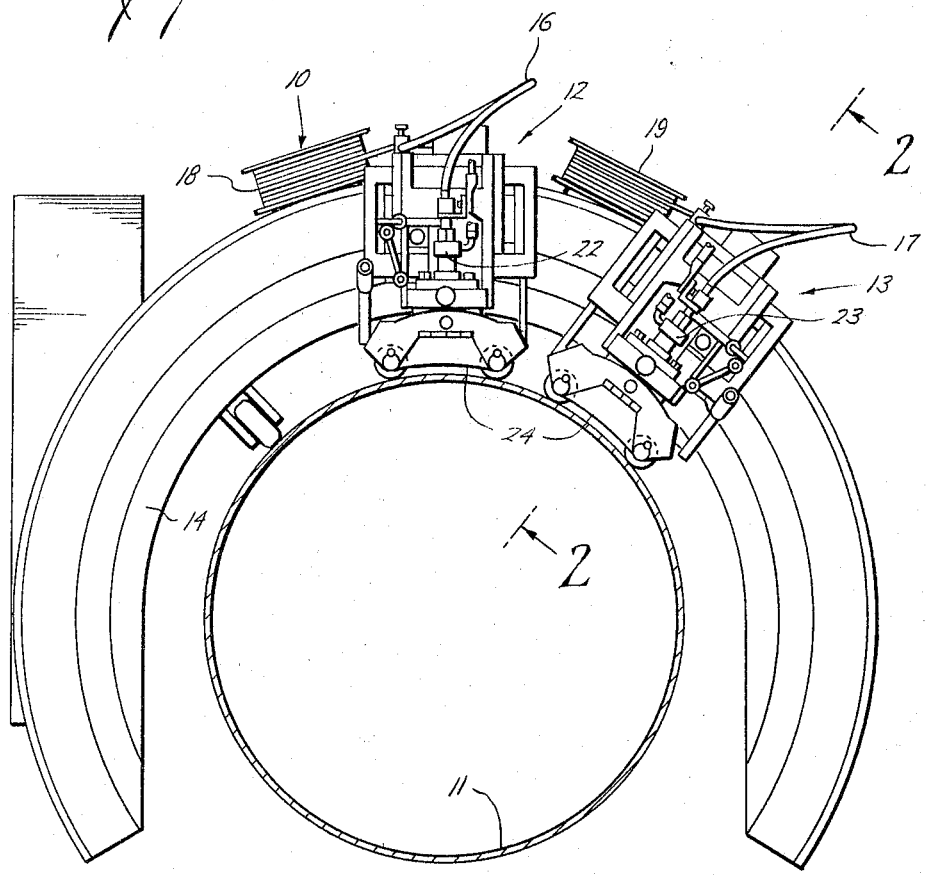

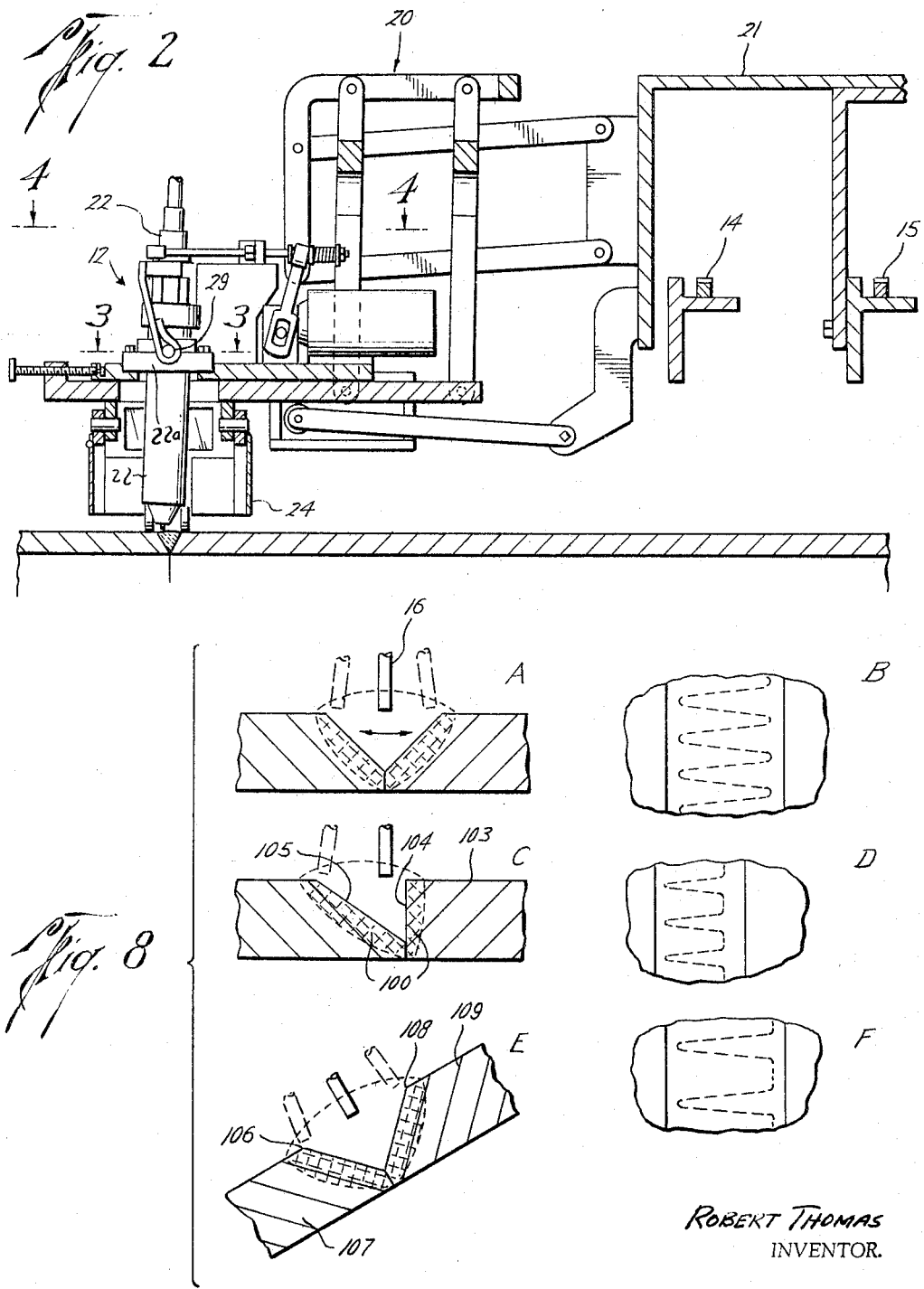

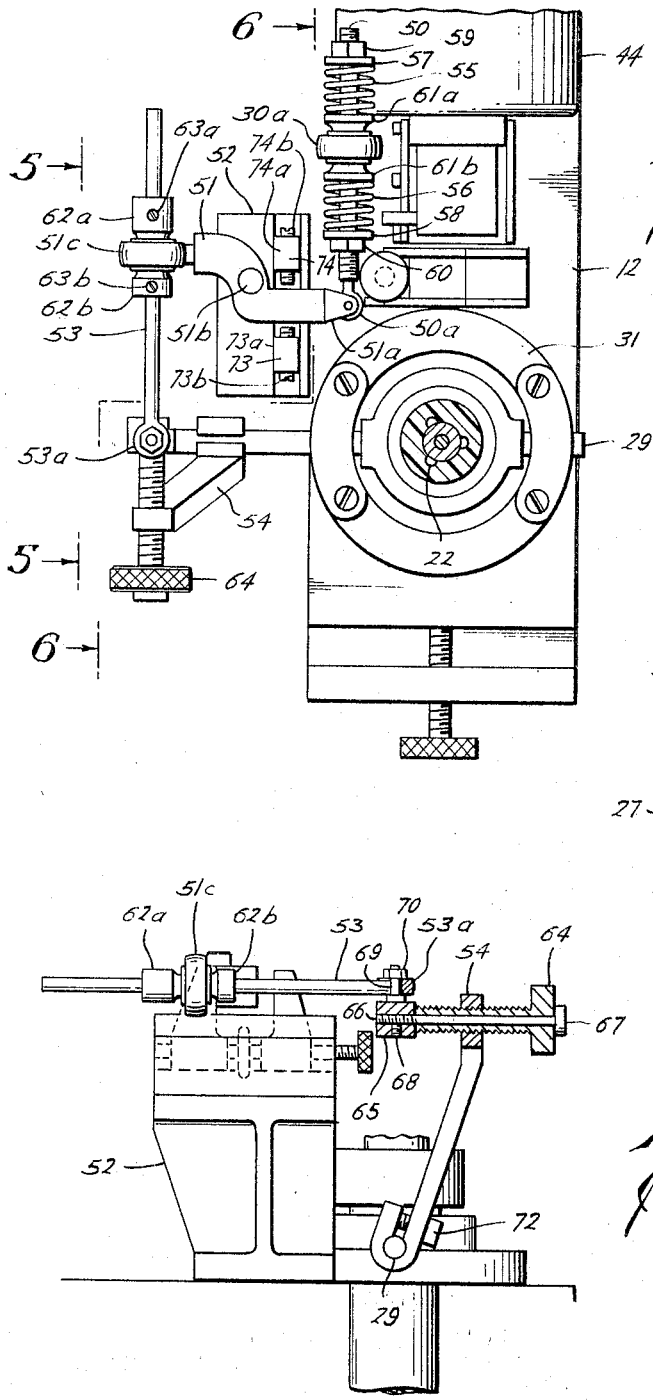

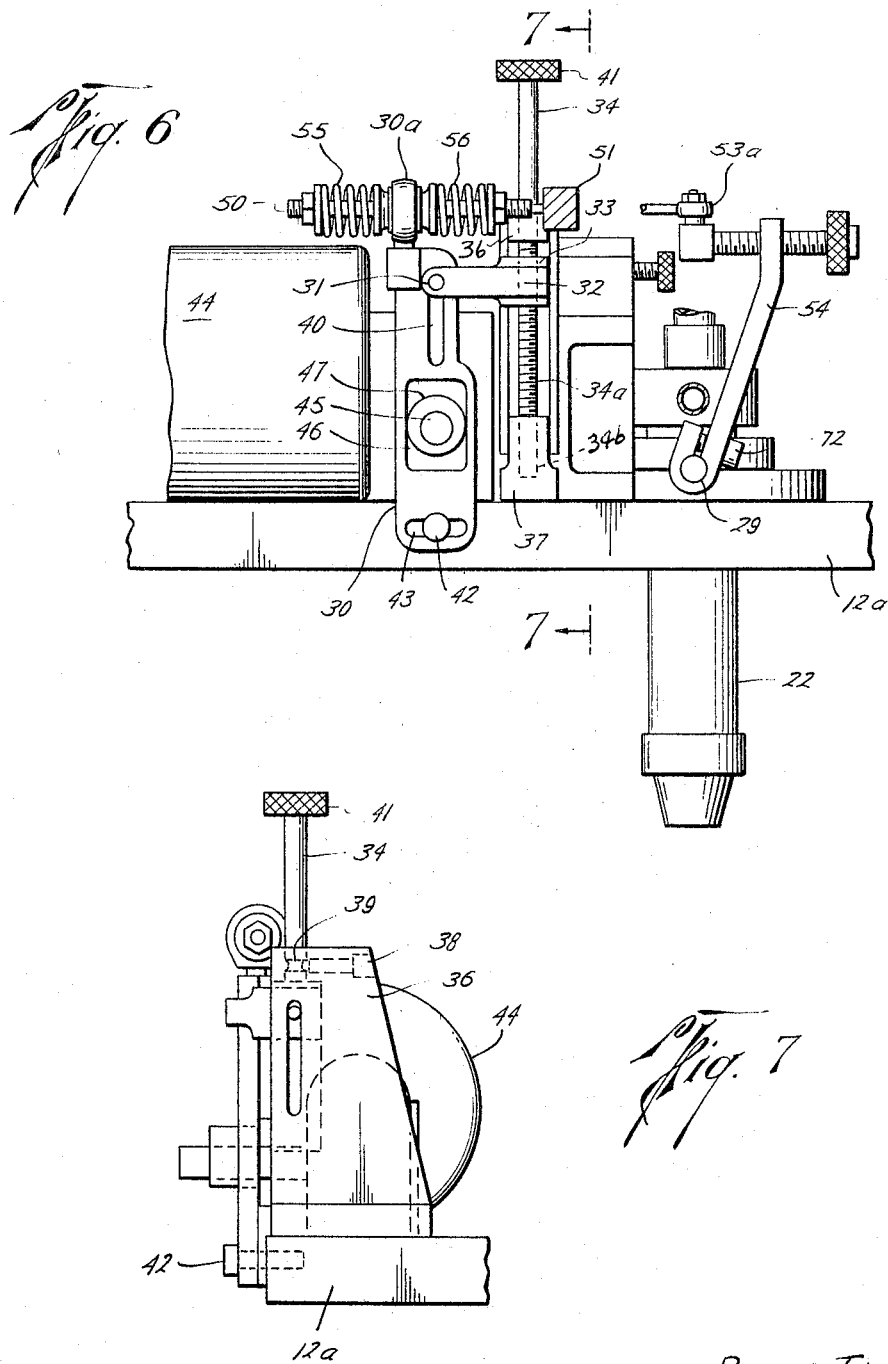

3,268,707
MECHANISM FOR OSCILLATING THE MOVABLE HEAT SOURCE OF A WELDING MACHINE
Robert Thomas, Houston, Tex., assignor to American Machine & Foundry Company, New York, N.Y., a corporation of New Jersey
Filed Oct. 14, 1963, Ser. No. 315,996
2 Claims. (Cl. 219—125)

This invention relates to improvements in welding apparatus generally, and in particular to improved apparatus for oscillating the movable heat source, employed in the welding process, from side to side as the movable heat source is moved along in the direction of the weld.

In the fusion welding process, both the weld metal and the base metal are heated above their melting points to cause an intermixing of the two metals and the subsequent fusion of the metals when cooled which welds the two surfaces of base metal together. To produce a complete weld between two surfaces, the movable heat source or electrode, as it is usually called, must be able to melt the base metal across both surfaces being welded. Otherwise, there will be zones of incomplete fusion where the base metal was not melted. Thus, where the heat produced by the electrode does not extend laterally far enough to melt the entire area of the surfaces being welded it is common practice to oscillate the electrode from side to side as it moves along in the direction of the weld. Such movement allows the electrode to melt a wider area of base metal, thus improving the quality of the weld and reducing the number of passes which would otherwise need to be made to complete the weld.

It is an object of this invention to provide a simply constructed mechanism, for mounting on a welding machine, to oscillate the electrode from side to side as it moves in the direction of the weld.

It is another object of this invention to provide a mechanism for oscillating the electrode of a welding machine from side to side at a constant speed as it travels in the direction of the weld.

The distance the electrode is moved laterally from the centerline of the weld, that is the amplitude of its oscillation, will depend upon the size and shape of the two surfaces being joined. For example, when performing a butt weld, such as that commonly used to join two sections of pipe together, with the ends of the pipe beveled in the conventional manner, the electrode should oscillate far enough on each side of the centerline of the weld to insure that the entire beveled surfaces of the ends of the pipe are melted so that the weld metal can fuse with the base metal across the entire wall thickness of the pipe. Thus, the wall thickness of the pipe and the angle of the bevel will determine the distance the electrode must oscillate to accomplish this result. Therefore, it is another object of this invention to provide a mechanism for oscillating the electrode of a welding machine from side to side as it travels in the direction of the weld which can be quickly adjusted to change the amplitude of the oscillation as required by the size and shape of the surfaces being welded.

As explained above, the fusion welding process melts both the base metal and the weld metal to obtain a mixture of the two to produce a fusion weld. This molten metal being liquid is, of course, affected by gravity. Therefore, when the objects being welded are inclined, the molten metal will tend to run to the low side of the space between the two surfaces being welded. Here again, using the example of the welding together of tubular members to form a pipeline, when the pipeline is going up or down a hill, the molten metal produced between the beveled end surfaces of the pipe during the welding operation will tend to run to the low side of the joint, which results in incomplete fusion of the base metal on the high side of the joint with the weld metal. Therefore, it is another object of this invention to provide a mechanism for oscillating an electrode of a welding machine from side to side as it travels in the direction of the weld, which can be adjusted so that the distance the electrode travels on one side of the weld is different from that which it travels on the other side. This particular feature is also advantageous where the angle of bevel of the end surfaces is not the same and, therefore, the electrode cannot travel on one side of the centerline of the weld as far as it does on the other, even though the weld itself may be perfectly level.

In this same connection, the length of time that the electrode spends at the end of its travel in each direction, that is, at the point where it begins to return toward the centerline of the weld, will determine the amount of base metal that the electrode melts during the time that it is at its other limits of travel. On many occasions, there will be a need for the electrode to pause or dwell for a short period of time at the end of its travel rather than immediately begin to return toward the centerline of the weld so that the electrode will be able to heat the metal adjacent the outer edge of the weld sufficiently to obtain good fusion.

Therefore, it is another object of this invention to provide a mechanism for oscillating the electrode of a welding machine from side to side as it travels in the direction of the weld which can be adjusted to cause the electrode to remain at its outer limits of travel for a period of time before moving back toward the centerline of the weld to allow the electrode to remain at its outer limits of travel a sufficient length of time to properly fuse the weld metal to the base metal at the outer edges of the weld.

These and other objects of the invention will be apparent upon a consideration of this specification, appended claims, and attached drawings, wherein like reference characters are used throughout to designate like parts and in which:

FIG. 1 is an illustration of a typical welding machine used to automatically weld together the ends of two joints of pipe, the view being an end elevation view showing the machine in position preparatory to welding two joints of pipe together;

FIG. 2 is a partial sectional view taken along line 2—2 of FIG. 1 showing the apparatus for positioning the electrode to weld together the two joints of pipe and to cause the electrode to move circumferentially around the pipe;

FIG. 3 is a sectional view taken along line 3—3 of FIG. 2 illustrating the apparatus used to pivotally mount the electrode holder whereby it can pivot in a plane generally perpendicular to the direction the electrode travels around the circumference of the pipe;

FIG. 4 is a top view of an embodiment of the mechanism of this invention taken along line 4—4 of FIG. 2 showing, however, only the embodiment of the invention used to oscillate the electrode holder and the necessary supporting components to thereby simplify the drawing and its description;

FIG. 5 is a view taken along line 5—5 of FIG. 4 showing a portion of the apparatus of FIG. 4 in elevation and a portion in section;

FIG. 6 is a view of the mechanism taken along line 6—6 of FIG. 4;

FIG. 7 is a view taken along line 7—7 of FIG. 6 showing the details of the apparatus employed to change the amplitude of oscillation which can be imparted to the electrode holder; and FIG. 8 is a schematic view illustrating various conditions which require changes in the amplitude of the oscillation of the electrode and the time that it dwells at each end or at either end of its movement with the movement for each particular situation also being illustrated in dotted lines in this view.

This invention is shown in the drawings and will be described below in connection with an arc welding machine of the type used to weld pipe together. However, it is to be understod that the invention has utility and can be employed with other types of welding machines.

Further, the term "electrode" is used herein to indicate the movable heat source for the fusion welding process. The movable heat source in the type of fusion welding process. The movable heat source in the type of fusion process, which is commonly called "arc welding," is an electrode, hence the reason for the use of the term herein. However, this invention can be used equally as well with other types of movable heat sources, such as those which employ a combustible gas to provide the heat.

FIG. 1 shows an end view of a conventional welding machine for welding together two joints of pipe. The machine, generally indicated by the number 10, is attached to and supported by pipe joint 11 which is one of the joints being welded together by the machine. The machine will not be described in detail as it is conventional and forms no part of this invention.

The particular machine shown employs two separate welding head assemblies 12 and 13, which travel in opposite directions around the circumference of the two pipe joints to be secured together by being welded. The welding head assemblies are carried around the pipe on ring gears 14 and 15 (FIG. 2) by a plurality of pinion gears (not shown) which are rotated by the welding machine. The arc welding machine illustrated is of the consumable electrode type, the electrode being made of wires 16 and 17 which are continuously supplied to the electrode holders from coils 18 and 19.

As best seen in FIG. 2, each electrode assembly is attached to and supported by an extensible mechanism, generally indicated by the number 20, which is located between the electrode assembly 12 and member 21 which is in turn rotatably supported on the welding machine by bearings (not shown). The extensible mechanism 20 allows the electrode assembly 12 to be moved up and down relative to the pipe and axially relative to the welding machine without changing the angle the longitudinal axis of the electrode holder makes with the surface of the pipe. This allows the electrode assembly to be positioned with respect to the ends of the pipe being welded together after the welding machine is mounted on the pipe. It also allows the electrode holder assembly to be quickly and easily adjusted to variations in the contour of the end of the pipe during the welding operation. The mechanism is fully explained and described in my copending patent application Serial No. 316,007, filed October 14, 1963, entitled "Apparatus for Mounting a Torch on a Welding Machine."

Each electrode assembly, 12 and 13, includes an electrode holder 22 and 23. The electrode holders hold the ends of the electrodes in position for forming the electric arc between the electrodes and the base metal which provides the heat necessary for the weld. They also electrically connect the electrode to a source of electric current sufficient to produce the necessary arc. In addition, they usually direct a flux into position to shield the molten weld metal produced by the arc and keep it from oxidizing or they maintain a non-oxidizing atmosphere around the arc. The type illustrated is of the latter type, having a housing 24 arranged to enclose the lower end of the electrode holder and maintain a non-oxidizing inert gas, supplied through the electrode holder into the interior of the housing, around the arc.

Each electrode holder 22 and 23 is mounted in the electrode holder assemblies 12 and 13 to freely pivot in a plane generally perpendicular to its direction of travel around the circumference of the pipe. This is accomplished in the embodiment illustrated and as shown in FIG. 3 in connection with electrode holder 22 by clamping the electrode holder within circular ring 25 by means of set screw 26. Ring 25, in turn, is clamped within outer ring 27 by set screws 28. Integrally attached to and extending out from both sides of ring 27 is shaft 29, which is pivotally supported in semicircular grooves (not shown) in the upper face of disc 22a which is, in turn, supported by the electrode assembly 12 (FIG. 2).

Thus the electrode holding assemblies include means for rotatably supporting the electrode holders so they can pivot in a plane generally perpendicular to the direction the electrode holding assemblies are moved by the welding machine. In the embodiment illustrated, this pivotal movement of the electrode holders is obtained by mounting them on such shafts 29 which are rotatably supported by the electrode holding assemblies with their axes extending transverse to the direction of travel of the electrode assembly.

In accordance with this invention, means are provided to oscillate the electrode holders and the electrodes about these axes.

In the embodiment illustrated, this oscillatory motion for each electrode holder is obtained through a drive member 30 (FIG. 6) which, as will be explained below, is arranged to pivot around pivot pin 31. The pivot pin is, in turn, supported by an arm 32 which extends outwardly from and is integrally attached to nut 33 which is adapted to threadingly engage the threaded portion 34a of a vertical rod 34. The rod, in turn, is supported by a bracket 36 mounted on base 12a of the electrode holding assembly 12.

The rod is rotatably supported by bracket 36 by means of rounded end set screw 38 which is located in a hole in the bracket with its end engaging groove 39 provided therefor in rod 34. Rod 34 is held in vertical alignment with nut 33 by means of guide member 37 which is provided with an opening to receive the lower unthreaded end 34b of rod 34.

Drive member 30 is supported by guide pin 42 which is attached to base 12a and extends through an elongated, horizontal slot 43 in the lower end of the drive chamber. The width and length of slot 43 and the diameter of pin 42 are such that the drive member can freely oscillate around pivot pin 31.

Pivot pin 31 is located in elongated slot 40 in drive member 30 to allow the location of the pin in the slot to be changed. This is done by rotating rod 34, by means of knob 41 provided on the upper end thereof, to cause nut 33 to either move up or down on threaded portion 34a of the rod which in turn will cause arm 32 to move pivot pin 31 up or down in elongated slot 40.

Means are provided to oscillate the guide arm around pivot pin 31. In the embodiment illustrated, electric motor 44 is mounted on base 12a and arranged with its output shaft 45 extending through rectangular opening 46 in drive arm 30. Cam member 47 is mounted eccentrically on shaft 45 in engagement with the side of opening 46 so that rotation of shaft 45 by electric motor 44 will cause cam member 47 to pivot drive arm 30 back and forth around pivot pin 31. Thus, by changing the speed of motor 44, the speed of oscillation can be varied and by changing the relative position of pivot pin 31 relative to the centerline of output shaft 45 the amplitude of oscillation of the upper end 30a of drive arm 30 can be varied.

Means are provided to transmit the oscillation of the upper end 30a of drive arm 30 to electrode holder 22 carried by electrode holding assembly 12. In the embodiment illustrated, this motion is transmitted to shaft 29 and electrode holder 22 through a linkage comprising rod 50 (FIG. 4); crank arm 51, which is attached to one end of rod 50, and pivotally mounted on pin 51b which is supported by post 52 attached to base 12a; rod 53, which is attached to the other end of crank 51, and which oscillates the upper end of rocker arm 54, which is attached to shaft 29 and which thereby causes shaft 29 to rotate back and forth, thus causing the end of electrode holder 22 to oscillate.

Means are provided to allow the amplitude of oscillation of the electrode to be less than the amplitude of oscillation of drive member 30. As will be explained below, this allows the mechanism to cause the electrode to dwell for a time at the end of its stroke, if desired. In the embodiment illustrated this is accomplished by providing resilient connection between rod 50 and end 30a of drive member 30. Thus, rod 50 extends through an opening provided therefor in end 30a and is caused to oscillate back and forth with the end by coil springs 55 and 56 located on each side of end 30a and which engage stops 57 and 58 carried by the rod. The stops are held in position against the ends of the coil spring by nuts 59 and 60. To allow rod 50 to pivot to some extent relative to the drive member, spring guides 61a and 61b are located on each side of end 30a to extend into the opening in the end of center rod 50 in the opening and also to maintain the coil springs properly positioned around rod 50. The surfaces of the spring guides, which engage the drive member, are arcuate to allow rod 50 to pivot to some extent relative to the member. Rod 50 will tend to pivot in the opening, since its end 50a is pivotally attached to end 51a of crank 51 and will thus move in an arcuate path with end 51a around its pivot point 51b.

The other end 51c of the crank is attached to rod 53 in a similar manner to allow rod 53 to pivot with respect to the crank. Thus, end 51c is provided with an opening through which rod 53 extends on each side of end 51c. Mounted on rod 53 are two members 62a and 62b, each of which is provided with a conically shaped, arcuate, surface which extends partially into the opening in the end 51c and engages the outer peripheral edge thereof. Both members are held on rod 53 by set screws 63a and 63b and positioned to allow rod 53 to pivot in the opening in end 51c of crank 51 as the crank pivots around its pivot point 51b.

End 53a of rod 53 is connected to the upper end of rocker arm 54 through adjusting screw 64 which is held against movement relative to the end of rod 53 but which threadedly engages a tapped hole in the end of arm 54. Rotation of adjusting screw 64 then will move the end of rocker arm 54 either away from and toward the end of rod 53 which will also rotate shaft 29 and change the position of electrode holder 22 with respect to the surfaces being welded. In this way, the oscillation which is imparted to the electrode can be positioned relative to the surfaces.

Since adjusting screw 64 is threadedly engaged with the upper end of rocker arm 54, it must be rotatably and pivotally attached to the end of rod 53. This connection is accomplished by providing a block 65 having a tapped hole 66 to receive the threaded end of tie rod 67 which extends through a longitudinal opening in adjusting screw 64 and rotatably supports the adjusting screw while holding it in position against block 65. Rod 67 is held in place by set screw 68. Extending out from block 65 is circular boss 69 having a threaded upper end to receive a nut 70 for holding end 53a of rod 53 in position on boss 69. In this manner, rod 53 is pivotally connected to rocker arm 54 through adjusting screw 64.

The end of rocker arm 54 which is connected to shaft 29 is bent into a U shape and provided with a circular opening therein to receive shaft 29 between the legs of the U. A bolt 72 is located through one leg and threadingly engaging the other to pull the two legs together and clamp the shaft therebetween.

Means are provided to control the amplitude of oscillation of the electrode holder and, as will be explained below, to produce a dwell time at the end of the travel of the electrode in either or both directions if desired. In the embodiment illustrated, these means comprise positive stops 73 and 74 located on each side of crank 51 between pivot point 51b and end 51a. These stops, of course, could be located at any convenient place which would limit the oscillation of the electrode holder. They are located, as shown in the embodiment, since post 52 which supports crank 51 can also conveniently support the stops. Stops 73 and 74 consist of lugs 73a and 74a which have threaded holes therethrough to receive set screws 73b and 74b, which engage the crank and limit its travel.

Operation

In describing the operation of the above-described embodiment of the invention, reference will be made to the schematic diagram shown in FIG. 8 which illustrates three commonly encountered conditions and the method of adjusting the apparatus to accommodate these varying conditions. For example, in FIG. 8A a conventional butt weld between the end surfaces of two pipe joints or plates is shown in cross section. The position of electrode 16 is shown dotted at the extreme ends of its oscillation from the centerline of the weld which in this case would be midway between the two surfaces. The outline of the desired weld, i.e., where fusion will occur, is indicated by a dotted line.

To obtain an intermixture of weld and base metals, of course, the base metal must be melted by the heat of the electrode so that it will intermix with the molten weld metal. Therefore, it is important that the electrode be oscillated back and forth so it will heat the entire area of the surfaces being welded sufficiently to raise them above their melting point to obtain a completely uniform fusion weld between the two surfaces.

FIG. 8B illustrates the sinusoidal path taken by the electrode as it is moved longitudinally along the weld by the welding machine and is simultaneously oscillated back and forth by the apparatus of this invention. The type of curve produced, of course, will depend upon the relative speeds of oscillation and longitudinal movement of the electrode by the welding machine. Also affecting the type of curve produced will be the type of cam used to oscillate drive member 30. For example, a cam could be used which would cause the electrode to accelerate from one point to another and decelerate from another point back, etc. Preferably, however, the cam is of the type which will move the electrode back and forth at a constant speed. This causes the electrode to follow a smooth sinusoidal path as shown in FIG. 8B. Of course, the wave length of the curve will be dependent on the relative speed of oscillation and will probably be much less than that shown in the figure.

When welding in the manner illustrated in FIG. 8A, the apparatus is arranged with stops 73 and 74 moved out of engagement with crank 51. This allows the entire motion of end 30a of drive member 30 to be transmitted to shaft 29 and electrode holder 22. The amplitude of oscillation produced will be determined by the location of pivot point 31 and can be adjusted as desired by rotating rod 34 to cause pivot pin 31 to move either toward or away from cam 47.

FIG. 8C illustrates an extreme example of the situation where the surfaces being welded are not beveled at the same angle. Here one member is beveled and the other is not. Where this occurs, it is necessary to adjust the oscillation of the electrode accordingly. This can be done in either of two ways or a combination of the two. For example, stop 74 can be moved into engagement with crank 51 or at least to a position where it will engage crank 51 and prevent the electrode from moving past the centerline of the oscillation of drive member 30, the type of curve shown in FIG. 8D will be obtained. Here the electrode will oscillate with an amplitude of only one-half of what it was in FIG. 8B and will remain stationary with respect to end 104 of member 103 during the time that drive member 30 is traveling through one-half of its oscillation. This produces a curve such as the one illustrated in FIG. 8D.

Where it is not desired for the electrode to remain stationary adjacent the end of member 103 for this length of time, the electrode can be positioned by adjusting screw 64 so that it will oscillate back and forth in the same manner as illustrated in FIG. 8A without producing any dwell time at the end of its travel in either direction. In other words, by adjusting the position of the electrode, through adjusting screw 64, so that it is more or less in between the end surface 104 of member 103 and the outer edge of beveled surface 105 and by adjusting the amplitude of the drive member by moving pivot pin 31 up or down, as the case may be, the same type of oscillation as used in FIG. 8A can be produced between the members in FIG. 8C.

FIG. 8E illustrates the condition which frequently occurs in the welding together of joints of pipe along a pipeline right-of-way which moves up and down over hills and through valleys. In these cases, the pipe is laying on unlevel ground and the molten metal will tend to gravitate to the low side of the weld. Therefore, it is desirable in these cases to allow the electrode to dwell for a period of time at the high side end of its oscillation in order to insure complete fusion of the metal on the high side of the weld. This can be done by locating the electrode so that drive member 30 will move it through an amplitude of oscillation extending from the desired point adjacent the lower edge 106 of the beveled end of member 107 to some point beyond the edge 108 of member 109 on the high side of the weld. Then by moving stop member 74 into position to engage crank 51 the electrode will be held adjacent edge 108 during the time that the drive member finishes its oscillation in that direction and moves back to the point where it picks up crank 51 again. The length of time that the electrode will dwell at this point will depend upon how far past point 108 the electrode would move, if not prevented by stop 74, and the speed of oscillation imparted to the drive member by motor 44. This can be adjusted as required by the angle of the weld, the thickness of the material, etc.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limting sense.

The invention having been described, what is claimed is:

1. In a welding machine adapted to move an electrode parallel to two surfaces being welded together by the electrode and having means for oscillating the electrode from side to side as it travels along the joint being welded to increase the area of base metal exposed to the heat of the electrode, the improvement comprising:
    (a) electrode holding means pivotally attached to the welding machine to oscillate the end of the electrode generally in a plane perpendicular to the longitudinal centerline of the weld;
    (b) a drive member resiliently connected by a rod to the electrode holding means, said rod extending through an opening in the drive member with stops attached thereto on each side of the member;
    (c) resilient means located between the stops and the member to allow the amplitude of the electrode holding means to be shorter than the amplitude of the drive member at the point where the rod is connected;
    (d) means mounting the drive member comprising a pivot pin around which the drive member pivots;
    (e) means resiliently connecting the drive member, at a point spaced from the pivot pin, to the electrode holding means to oscillate the electrode holding means in response to the oscillation of the drive member;
    (f) means for adjusting the space between the pivot pin and the point where the connecting means is attached to the drive member to allow the amplitude of the oscillations of the drive member to be adjusted;
    (g) means for causing the drive member to oscillate around the pivot pin to thereby cause the electrode holding means to oscillate; and
    (h) means for adjusting the amplitude of the oscillation of the electrode holding means.

2. The electrode oscillating apparatus of claim 1 in which the motion of the rod connected to the drive member is transmitted to the electrode holding means by a crank arm pivotally mounted on the welding machine with adjustable stop means located on each side of the crank arm to limit the distance the arm can rotate to thereby adjust the amplitude of the oscillations of the electrode and the location of the electrode with respect to the two surfaces being welded as it oscillates.

References Cited by the Examiner
UNITED STATES PATENTS

| | | | |
|---|---|---|---|
| 1,956,406 | 4/1934 | Vars | 219—125 |
| 2,472,803 | 6/1949 | Beyer et al. | 219—125 |

RICHARD M. WOOD, *Primary Examiner.*

J. V. TRUHE, *Assistant Examiner.*